Figure 3:
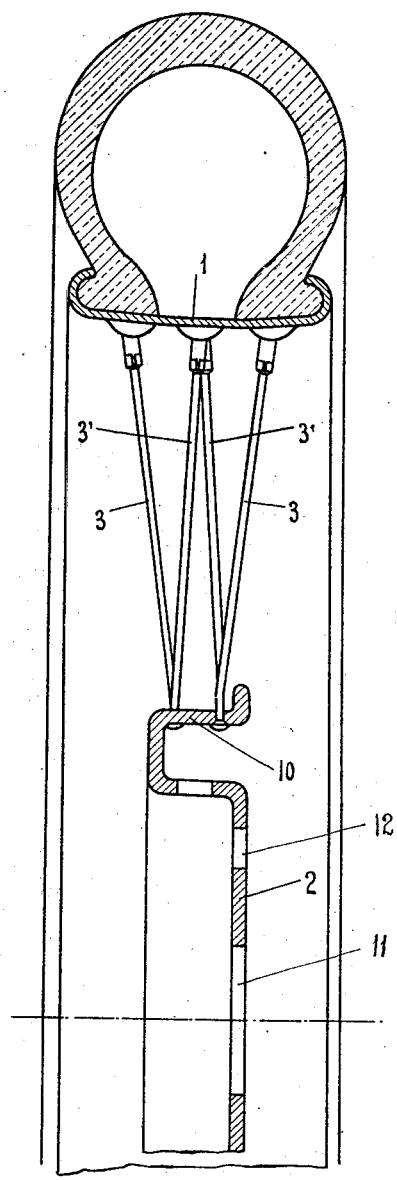

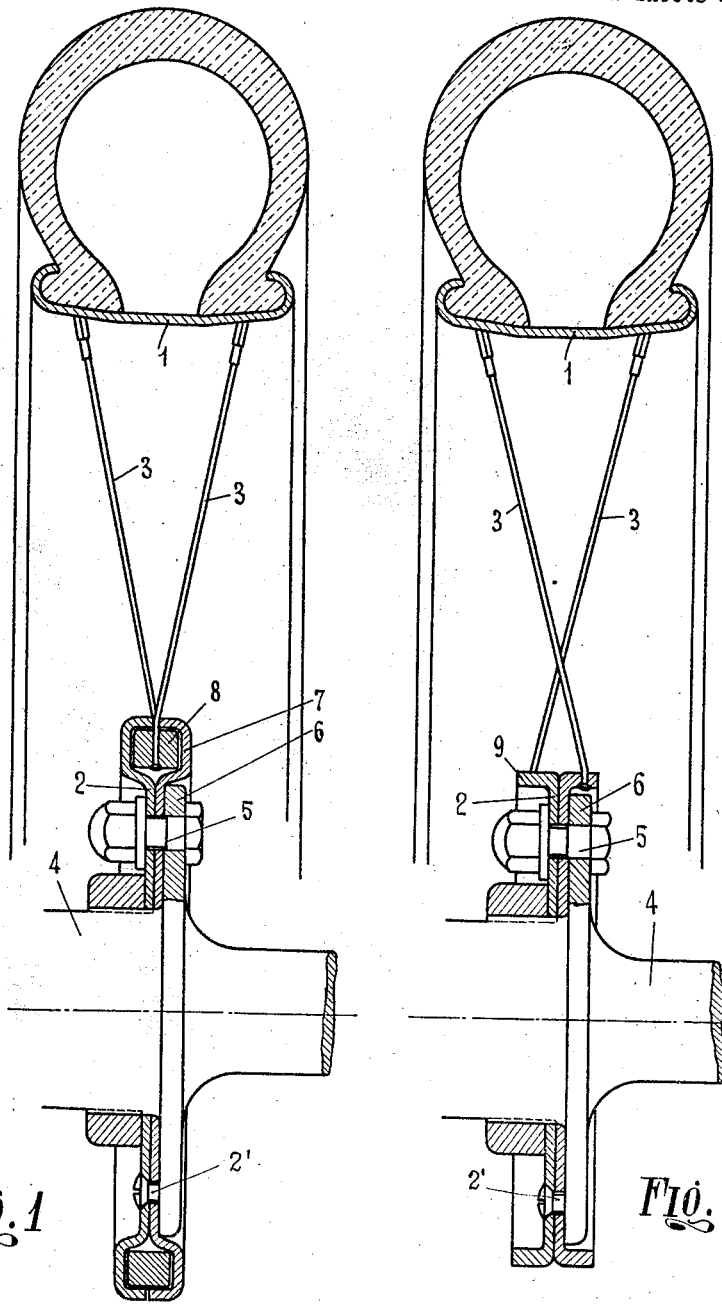

Patented June 15, 1926.

1,588,957

UNITED STATES PATENT OFFICE.

EDOARDO FERRABINO, OF TURIN, ITALY.

WIRE-SPOKE WHEEL.

Application filed May 19, 1923, Serial No. 640,113, and in Italy May 30, 1922.

The present invention relates to wire spoke wheels for automotive vehicles, and has for its object a wheel of this kind in which the spokes are arranged in diverging rows with the hub ends of the spokes of two or more rows adjacent to each other while the rim ends of the same are spaced from each other in the axial direction of the wheel.

On the annexed drawing are shown by way of example three embodiments of the present invention.

In said drawing: Figure 1 is a central section of a wheel with two spoke rows; Figure 2 is a central section of a modified construction and Figure 3 is a central section of a wheel with four rows of spokes.

The wheel shown in Figure 1 comprises a hub 2 consisting of two halves interconnected by screws 2' and providing a peripheral channel 7 in which is located a ring 8; to this ring is attached one end of the spokes 3 which have their outer ends fastened to the rim 1 near its sides, the alternating spokes 3 being attached to the rim 1 at its opposite edges as illustrated. The hub 2 is provided with a central opening for insertion on the axle hub 4 and is fastened on axle flange 6 by means of bolts 5.

In the construction of Figure 2 the wheel hub comprises two sections 2—2 interconnected by means of screws 2' and having outer peripheral flanges 9 to each of which is fastened one row of spokes 3, these spokes having their outer ends fastened to the rim 1. As shown on the drawing the axial distance between the fastening points of the spokes of the two rows on the hub is smaller than the distance of their fastening points on the rim 1.

In both constructions the spokes are attached to the rim near its edges and converge towards the middle plane of the wheel, they being attached to the hub along the same circle or along circles at a smaller distance from each other than the circles along which the spokes are attached to the rim; therefore the extension of the hub in the direction of the wheel axis is reduced to a minimum.

Figure 3 shows a construction in which the wheel comprises two pairs of rows of spokes. In this construction the wheel hub consists of a sheet metal disk 2 having a central hole 11 and a row of peripheral holes 12 for insertion of the wheel hub on the axle hub and for engagement with the axle flange by means of bolts not illustrated in this figure but shown in Figures 1 and 2; said disk 2 provides at its periphery a channel rim 10 to which are fastened the hub ends of the spokes. There are four rows of spokes which are arranged in two pairs as 3—3' and the spokes of each pair have their hub ends close to each other, while their opposite ends are connected with the rim 1 at points spaced apart from each other in the axial direction of the wheel. In this construction are provided two pairs of spoke rows, these pairs having their spokes fastened to the hub close to each other, while their rim ends are spaced from each other in the axial direction of the wheel.

The wheel according to this invention shows thus the advantage that its hub consists of a member having a small extension in the axial direction of the wheel and it provides means for an easy mounting and connection with axle hubs of usual construction, while at the same time the size of the wheel is reduced.

What I claim as my invention and desire to secure by United States Letters Patent is:—

1. A wire spoke wheel, comprising, a hub, a rim, spokes interconnecting the hub and rim, said spokes forming two lateral rows attached to said rim and hub and other rows attached at the edges of the attaching zone in one member and at the middle of the attaching zone in the other member.

2. A wire spoke wheel, comprising, a hub, a rim, spokes interconnecting said hub and rim, said spokes forming two lateral rows attached to said hub along lines which are nearer to each other than the distance between rows of attaching points of said spokes in said rim, and other spoke rows attached at the edges of the attaching zone in one member, and at the middle of the attaching zone in the other member.

3. A wire spoke wheel, comprising, a hub, a rim, spokes interconnecting said hub and rim, said spokes forming two lateral rows attached to said hub along lines which are nearer to each other than the distance between rows of attaching points of spokes in said rim, and two spoke rows attached at the edges of the attaching zone in one member and at the middle of the attaching zone in the other member.

In testimony whereof, I have signed my name to this specification.

EDOARDO FERRABINO.